under Patent Office
2,792,441
Patented May 14, 1957

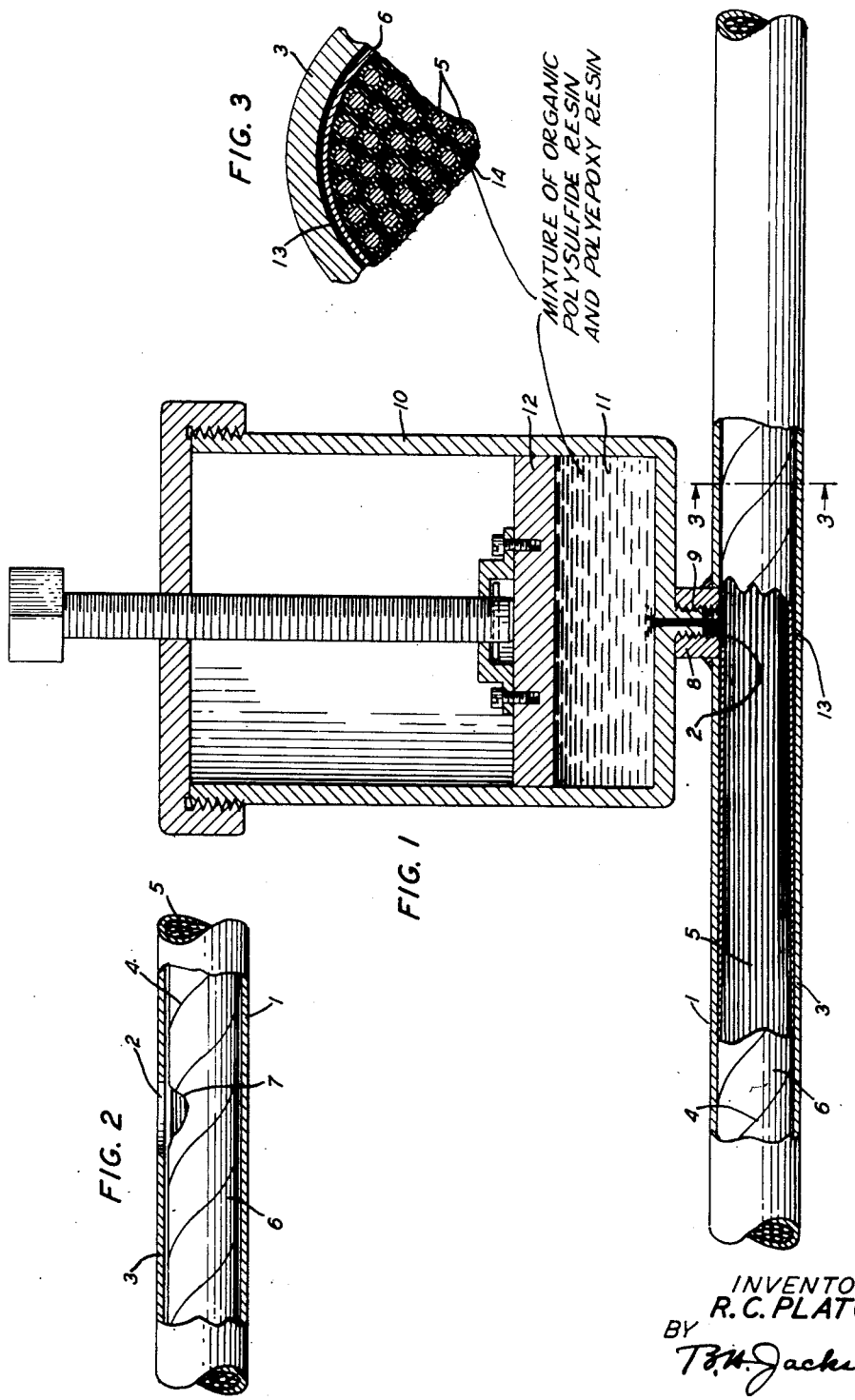

2,792,441

SEALING ELECTRICAL APPARATUS

Raymond C. Platow, Morristown, N. J., assignor to Bell Telephone Laboratories, Incorporated, New York, N. Y., a corporation of New York Application August 15, 1952, Serial No. 304,537

6 Claims. (Cl. 174—23)

This invention relates to sealed electrical apparatus. It is particularly concerned with metal-sheathed electrical cables having gas-tight plugs formed therein.

In telephone cable systems using sheathed cable, it is common to maintain an internal gas pressure, usually of the order of 10 pounds per square inch, within the sheath for the exclusion of moisture when a crack in the sheath occurs and for leak-locating purposes. The maintenance of gas pressure requires a gas-tight seal at all cable terminals and at the ends of pressurized zones.

The present invention provides such a gas-tight seal which can be installed simply and quickly within the sheath without the necessity for extensive opening of the sheath or preparation of the cable core. The seal is formed by making a small opening in the sheath and injecting a fluid resin which is capable of permeating the cable core and impregnating the wire insulation and which then sets within a reasonable time to a resilient solid state in which it forms a gas-tight plug capable of meeting service requirements.

It is necessary that the resulting plug remain gas-tight indefinitely under the continuous normal gas pressure at ordinary atmospheric temperatures and that it withstand, for short periods of time, gas pressures which are three to four times as high as the normal pressure. The plug must remain gas-tight over a temperature range of −50° F. to +140° F. during the service life of the cable and must be capable of withstanding repeated temperature cycling within this range. It is also necessary that the material of which the plug is formed have no corrosive or deteriorative effect on the sheath or the wires, that it have no injurious effect upon the pulp, strip paper or other insulation present and that it have no serious detrimental effect upon the dielectric strength or insulation resistance of the cable.

According to the present invention, plugs meeting the above requirements are formed in cables, in the manner indicated, by injecting into the cable a mixture of a liquid polysulfide resin and a liquid epoxy resin or epoxy resin-forming material together with a small amount of a curing agent. The manner in which the seals are formed is shown in the accompanying drawing, in which:

Fig. 1 is a front elevation, partly in section, of a length of cable together with associated apparatus for injecting the liquid resin;

Fig. 2 is a front elevation, partly in section, of a length of cale having an opening formed in its sheath as the first step in preparation for attachment of the resin-injecting device; and Fig. 3 is a view of a portion of a section of the cable of Fig. 1 taken along the line 3—3.

As shown in the drawing, the first step in the formation of a gas-tight plug in a lead sheathed cable 1 is the formation of a small opening 2 (Fig. 2) in the sheath 3 of the cable. In the cable shown in the drawing, the cable core 4 is made up of a plurality of wires 5 each covered with a fibrous insulation as of paper pulp, wound paper, or similar material. The bundle of wires 5 may be enclosed in a helical paper wrapping 6.

In order to permit the plugging material to penetrate within the wrapping 6 and completely permeate the spaces between the wires, a portion of the wrapping 6 just under the opening 2 is torn away to leave an opening 7. An internally threaded nipple 8 is then fastened over the opening 2 as by soldering, as shown in Fig. 1 or by clamping. An externally threaded short nozzle 9 of an injection device 10 is then screwed into the nipple 8. The injection device 10 contains a charge 11 of the plug-forming material and is equipped with a piston 12 for forcing the charge 11 out through the nozzle 9.

The relatively fluid plug-forming material which makes up the charge 11 is forced into the interior of the cable and completely fills all of the free spaces across the cross-section of the cable including the space 13 between the wrapper 6 and the sheath 3 and the spaces 14 between the wires and between the wires and the wrapper 6. It completely impregnates the fibrous insulation of the wires so as to prevent gas leakage through the insulation. Plugging material penetrates along the length of the cable for a distance which may be of the order of from six to twelve times the internal diameter of the cable.

A plugging material is used which, although initially relatively fluid, sets without external heating within a short time after its injection into the cable to form a non-fluid rubbery solid. The setting takes place sufficiently rapidly so that the plug is formed before the plugging material has time to flow under the influence of gravity or capillarity along the length of the cable to such an excessive degree that the entire cross-section of the cable is no longer filled.

In the plugging of substantially horizontal cables, the sheaths of which have an internal diameter not exceeding about one inch, the formation of plugs in this manner is accomplished without difficulty. With similar cables which are mounted in a vertical position, the tendency is much greater for the plugging material to flow within the cable before setting, and it is usually desirable to constrict the cable at at least the lower end of the volume to be occupied by the injected plugging material. This constriction is accomplished by forming a circular indentation around the circumference of the cable at the constriction point, as by hammering or by the use of known constricting tools. The constrictions retard the flow of plugging material away from the region in which it is desired to form the plug.

When it is desired to form plugs in cables having larger inside diameters, up to about three inches, it is usually desirable, even when the cables are horizontally disposed, to employ cable sheath constrictions at both ends of the volume to be occupied by the injected plugging material in order to prevent excessive flow of the plugging material prior to setting.

After the plugging material has been injected into the cable, the nozzle 9 of the injection device is removed from the nipple 8 and the hole in the nipple is closed as by screwing into it an externally threaded plug (not shown).

Cables sheathed with metals other than lead or sheathed with plastics such as polyethylene or sheathed with layers of both metal and plastic sheathing materils, such as polyethylene are also often maintained under internal pressure and can have gas-tight plugs formed within them by the procedure described above. Similarly cables containing wires insulated with non-porous and non-fibrous insulation, such as solid plastic insulation can also have gas-tight plugs formed within them by this method.

It is not ordinarily feasible to apply a pressure greater than 250 pounds per square inch in injecting the plugging material into the cable. It is, therefore, necessary that the viscosity of the plugging material at 25° C. at the time of injection be not greater than 500 poises and preferably not greater than 300 poises. The plugging materials of the present invention can be prepared to have a viscosity at 25° C. which initially, after mixing, is not greater than 50 poises and which does not exceed the initial viscosity in thirty minutes. Despite their retention of relatively low viscosities for a sufficient time to permit injection, they are capable of setting to a non-flowing gel within about ninety minutes after mixing.

As stated above, the plugging material is formed of a mixture of a liquid polysulfide resin and a liquid epoxy resin or epoxy resin-forming material together with a small amount of a curing agent.

The liquid organic polysulfide resins are known to the art and may be prepared as described in United States Patent 2,402,977, issued July 2, 1946, to J. C. Patrick and Harry R. Ferguson. The molecules of these polysulfide resins are made up of essentially straight chains of a plurality of organic radicals joined by linkages made up of sulfur atoms. The molecules terminate at each end with mercapto radicals and carry an occasional mercapto radical as a side group to provide cross-linking between linear chains upon curing. The organic radicals are commonly hydrocarbon radicals but may also contain oxygen hetero atoms in the hydrocarbon chains.

Polysulfide resins as a class are formed by the reaction of an alkaline polysulfide with an organic compound having at least two carbon-attached negative radical substituents which are capable of splitting off by reaction with the alkaline polysulfide. Although the negative radicals may theoretically be halogen, nitrate, sulphate, acid sulphate, carbonate, acetate, propionate, acid phosphate, tartrate and similarly acting radicals, chlorine substituents are the ones most commonly used in the art. When the organic compound reacts with the alkaline polysulfide, the alkaline radical combines with the chlorine or other negative substituent, leaving the residual organic radicals bonded together by polysulfide groups.

Polysulfide resins formed from organic compounds containing only two chlorine or other negative substituents are essentially linear and, when cured alone, are subject to cold flow. Polysulfide resins, formed from organic compounds containing more than two chlorine or other negative substituents, produce cross-linked or network molecular structures, upon curing, which do not flow substantially. Preferably, the polysulfide resins used for the formulation of the plugging materials of the present invention are of the latter type and are formed from a mixture made up primarily of an organic compound having only two negative substituents but containing a small proportion of an organic compound having more than two negative substituents.

In the manufacture of polysulfide resins as described above, the viscosity of the resin can be controlled by mixing an alkaline hydrosulfide with the alkaline polysulfide which is reacted with the organic compound. As discussed in the above-mentioned United States Patent 2,402,977, the higher the ratio of hydrosulfide to polysulfide in the mixture, the lower the viscosity of the resin which is produced. For the purposes of the present invention, a polysulfide resin should be used which has a viscosity at 25° C. not greater than 25 poises and preferably of the order of 8 to 14 poises.

A particularly suitable polysulfide resin for the purposes of the present invention is one, within the viscosity limits set forth above, formed by the reaction of an alkaline polysulfide or alkaline hydrosulfide-polysulfide mixture, such as a mixture of sodium hydrosulfide and sodium tetrasulfide, with a mixture of dichlordiethylformal containing between 1 percent and 3 percent of trichlorpropane or dichlorpropyl mercaptan.

The epoxy resin or epoxy resin-forming material used in forming the plugging materials of the present invention comprises a polyepoxy compound, which is preferably a diglycidyl ether of a diphenol, in its monomeric or partially polymerized form. Its viscosity at 25° C. should not exceed 150 poises and is preferably in the vicinity of 85 poises. Such diglycidyl ethers are available in the art. Their preparation is described, for instance, in United States Patent 2,506,486, issued May 2, 1950, to H. L. Bender, A. G. Farnham and J. Walter Guyer.

They are commonly prepared by reacting two or more molar proportions of epichlorhydrin with one molar proportion of a diphenol in the presence of sufficient sodium hydroxide to neutralize the hydrochloric acid released by the reaction. The diphenols from which the diglycidyl ethers are prepared are dihydroxydiphenylmethanes, such as 4,4' dihydroxydiphenyldimethylmethane.

When the polysulfide resin is mixed with the polyepoxy compound, the two substances react slowly at room temperature and eventually set to a gel. This rate of reaction is not adequate for the purposes of the present invention, however. The reaction rate is accelerated, to the point at which gelling occurs at room temperature within a reasonable time while leaving the mixture at low viscosities for a sufficient period of time to permit injection into the cable, by incorporating a curing catalyst.

Any alkaline reacting substance can be used as a curing catalyst. Preferably, however, an amine is used for this purpose. Among the suitable amines may be mentioned the primary, secondary or tertiary monoamines, diamines or triamines, such as dimethylamine, trimethylamine, triethylamine, diethylene triamine or ethylene diamine.

Since alkaline materials are catalysts for the curing of polyepoxy compounds alone, as well as for mixtures of polyepoxy compounds with polysulfide resins, the catalyst should not be brought into contact with the polyepoxy compound prior to the preparation of the mixture for injection. The catalyst, however, has no effect upon the polysulfide resin and therefore can be, and preferably is, mixed therewith prior to the preparation of the final plugging mixture. The premixing of the catalyst with the polysulfide resin simplifies the effective dispersion of the catalyst at the time the polyepoxy compound is added without the necessity for excessive mixing.

The polysulfide resin and the polyepoxy compound are so proportioned in forming the plugging material that the ratio of polysulfide resin to polyepoxy compound, by weight, lies between 1.5 to 1 and 4 to 1, and preferably between 2 to 1 and 3 to 1. The amount of curing catalyst will ordinarily lie between about .2 percent and about 10 percent, by weight, of the total mixture, and is preferably between .25 percent and 1 percent.

A desirable plugging material was formed by mixing 261 parts by weight of polysulfide resin with 2 parts by weight of amine catalyst. Just before injection into the cable, 100 parts by weight of polyepoxy compound were added to the mixture. Plugs formed by injecting the resulting mixture into cables and allowing them to set were found to have excellent properties as gas pressure barriers.

The invention has been described above in terms of specific embodiments and since certain modifications and equivalents may be apparent to those skilled in the art, this description is intended to be illustrative of, but not necessarily to constitute a limitation upon, the scope of the invention.

What is claimed is:

1. A sheathed electrical cable made up of a plurality of electrical conductors enclosed in a sheath, said cable having a gas-tight plug enclosed within the sheath and adhering to the inner surface of the sheath and to the surface of said conductors, said plug being one formed by the curing in situ of a mixture of a liquid organic polysulfide resin and a liquid organic polyepoxy compound in the presence of an alkaline reacting catalyst.

2. A sheathed electrical cable containing a gas-tight plug and adapted to be maintained under internal gas pressure on one side of the plug, said cable being formed of a sheath filled with a plurality of electrical conductors each insulated with a layer of porous insulation, the free space within a short length of said cable being filled with a non-fluid resin which impregnates said layers of porous insulation and adheres to the inner surfaces of said sheath so as to form said gas-tight plug, said resin being the product of the reaction of a liquid organic polysulfide resin and a liquid polyepoxy compound.

3. A cable as defined in claim 2 wherein the non-fluid resin is the product of the reaction of a liquid organic polysulfide resin and a diglycidyl ether of a diphenol in the presence of an alkaline reacting catalyst.

4. A cable as defined in claim 3 wherein the ratio of polysulfide resin to diglycidyl ether lies between 1.5 to 1 and 4 to 1 and the amount of catalyst lies between .2 percent and 5 percent, by weight, of the mixture of polysulfide resin, polyepoxy compound and catalyst.

5. A cable as defined in claim 4 wherein the non-fluid resin is the product of the reaction of about 261 parts by weight of liquid organic polysulfide resin with about 100 parts by weight of a diglycidyl ether of a dihydroxydiphenylmethane in the presence of about 2 parts of an amine as a catalyst.

6. A cable as defined in claim 5 wherein the liquid organic polysulfide resin is one formed by the reaction of an alkaline polysulfide with dichlordiethylformal containing between about 1 percent and about 3 percent of dichloropropyl mercaptan.

References Cited in the file of this patent

UNITED STATES PATENTS

| | | |
|---|---|---|
| 1,769,524 | Mample | July 1, 1930 |
| 1,774,292 | Reed | Aug. 26, 1930 |
| 2,209,895 | Webb | July 30, 1940 |
| 2,633,458 | Shokal | Mar. 31, 1953 |

FOREIGN PATENTS

| | | |
|---|---|---|
| 450,088 | Great Britain | July 6, 1936 |